(12) United States Patent
Ziraknejad et al.

(10) Patent No.: US 10,163,105 B1
(45) Date of Patent: Dec. 25, 2018

(54) VARIABLE BIOMETRICS FOR MULTI-FACTOR AUTHENTICATION

(71) Applicant: MicroStrategy Incorporated, Vienna, VA (US)

(72) Inventors: Siamak Ziraknejad, Reston, VA (US); Elaine Li, Vienna, VA (US); Ren-Jay Huang, Leesburg, VA (US)

(73) Assignee: MicroStrategy Incorporated, Vienna, VA (US)

( * ) Notice: Subject to any disclaimer, the term of this patent is extended or adjusted under 35 U.S.C. 154(b) by 707 days.

(21) Appl. No.: 14/600,274

(22) Filed: Jan. 20, 2015

Related U.S. Application Data

(60) Provisional application No. 61/931,237, filed on Jan. 24, 2014.

(51) Int. Cl.
*G06K 5/00* (2006.01)
*G06Q 20/40* (2012.01)

(52) U.S. Cl.
CPC ... *G06Q 20/4016* (2013.01); *G06Q 20/40145* (2013.01)

(58) Field of Classification Search
CPC .......... G06F 21/31; G06F 21/32; G06F 21/57; G06F 2221/2101; G06F 2221/2137; G06F 2221/2151; H04L 63/0861; H04L 2209/56; H04L 2209/80; H04L 2463/082; H04L 63/0853; H04L 63/0876; H04L 9/3228; H04L 9/3231; H04L 9/3234; G06K 9/00335; G06Q 20/3276; G06Q 20/3829; G06Q 20/40; G07F 19/20; H04W 12/04; H04W 12/06

USPC ........................................................ 235/380
See application file for complete search history.

(56) References Cited

U.S. PATENT DOCUMENTS

| | | |
|---|---|---|
| 8,260,009 B2 | 9/2012 | Du |
| 8,296,323 B2 | 10/2012 | Pollard |
| 8,370,639 B2 | 2/2013 | Azar |
| 8,595,810 B1 | 11/2013 | Ben Ayed |
| 8,798,336 B2 | 8/2014 | Nechyba |
| 9,160,743 B2 | 10/2015 | Anantharaman |
| 9,215,321 B2 | 12/2015 | Timem |
| 9,246,898 B2 | 1/2016 | McKeeman |
| 9,294,474 B1 | 3/2016 | Alikhani |

(Continued)

OTHER PUBLICATIONS

Emanuela Marasco et al., "Combining Match Scores with Liveness Values in a Fingerprint Verification System", Proc. of 5th IEEE International Conference on Biometrics: Theory Applications and Systems (BTAS), Washington, DC, Sep. 2012, 8 pages.

(Continued)

*Primary Examiner* — Thien M Le
*Assistant Examiner* — Tae Kim
(74) *Attorney, Agent, or Firm* — Fish & Richardson P.C.

(57) ABSTRACT

In one implementation, requirement client device receives an indication of a transaction. The client device determines risk profile information and a credential for the transaction. The risk profile information describes a location of the client device, a time associated with the transaction, and a transaction provider to complete the transaction Finally, the client device prompts for biometric input based on the location of the client device, the time associated with the transaction, the transaction provider to complete the transaction, and the credential.

19 Claims, 5 Drawing Sheets

(56) References Cited

U.S. PATENT DOCUMENTS

| | | |
|---|---|---|
| 9,721,175 B2 | 8/2017 | Kursun |
| 2003/0046237 A1 | 3/2003 | Uberti |
| 2006/0110011 A1 | 5/2006 | Cohen |
| 2007/0186106 A1 | 8/2007 | Ting |
| 2007/0271596 A1 | 11/2007 | Boubion |
| 2008/0097851 A1 | 4/2008 | Bemmel |
| 2009/0199264 A1* | 8/2009 | Lang ................ G06F 21/31 726/1 |
| 2010/0228692 A1 | 9/2010 | Guralnik |
| 2011/0311111 A1 | 12/2011 | Allburn |
| 2012/0303476 A1 | 11/2012 | Krzyzanowski |
| 2013/0086674 A1* | 4/2013 | Horvitz ............. G06F 21/32 726/19 |
| 2013/0124855 A1* | 5/2013 | Varadarajan ....... G06Q 20/3276 713/155 |
| 2013/0179954 A1 | 7/2013 | Bidare |
| 2013/0211900 A1 | 8/2013 | Dessert |
| 2013/0227651 A1* | 8/2013 | Schultz ............. G06F 21/32 726/4 |
| 2014/0077929 A1 | 3/2014 | Dumas |
| 2014/0189808 A1 | 7/2014 | Mahaffey |
| 2015/0033305 A1 | 1/2015 | Shear |
| 2015/0046711 A1* | 2/2015 | Slaby ................ H04L 63/08 713/170 |

OTHER PUBLICATIONS

Karthik Nandakumar, "Likelihood Ratio-Based Biometric Score Fusion", IEEE Transactions on Pattern Analysis and Machine Intelligence, vol. 30, No. 2, Feb. 2008, pp. 342-347.

L. Latha et al., "Efficient approach to Normalization of Multimodal Biometric Scores", International Journal of Computer Applications (0975 — 8887), vol. 32, No. 10, Oct. 2011, pp. 57-64.

Arun Ross et al., "Information fusion in biometrics", Pattern Recognition Letters 24 (2003) 2115-2125.

Arun Ross et al., "Exploiting the "Doddington Zoo" Effect in Biometric Fusion", Proc. of 3rd IEEE International Conference on Biometrics: Theory, Applications and Systems (BTAS), (Washington DC, USA), Sep. 2009, 7 total pages.

Hamad, H., et al, 'Data encryption using the dynamic location and speed of mobile node', Journal Media and Communication Studies, vol. 2(3) pp. 067-075, Mar. 2010, http://www.academicjournals.org/article/article1382008750_Hammad%20and%20Elkourd%202.pdf.

* cited by examiner

VARIABLE BIOMETRICS FOR MULTI-FACTOR AUTHENTICATION

CROSS-REFERENCE TO RELATED APPLICATION

This application claims priority from U.S. Provisional Application No. 61/931,237, filed Jan. 24, 2014, and titled "Variable Biometrics for Multi-Factor Authentication," which is incorporated by reference in its entirety.

TECHNICAL FIELD

This specification generally relates to authentication.

BACKGROUND

A user's identity may be authenticated using biometric information.

SUMMARY

This disclosure relates to variable biometrics for multi-factor authentication.

The details of one or more implementations are set forth in the accompanying drawings and the description, below. Other features will be apparent from the description and drawings, and from the claims.

DETAILED DESCRIPTION

Figure 1A:
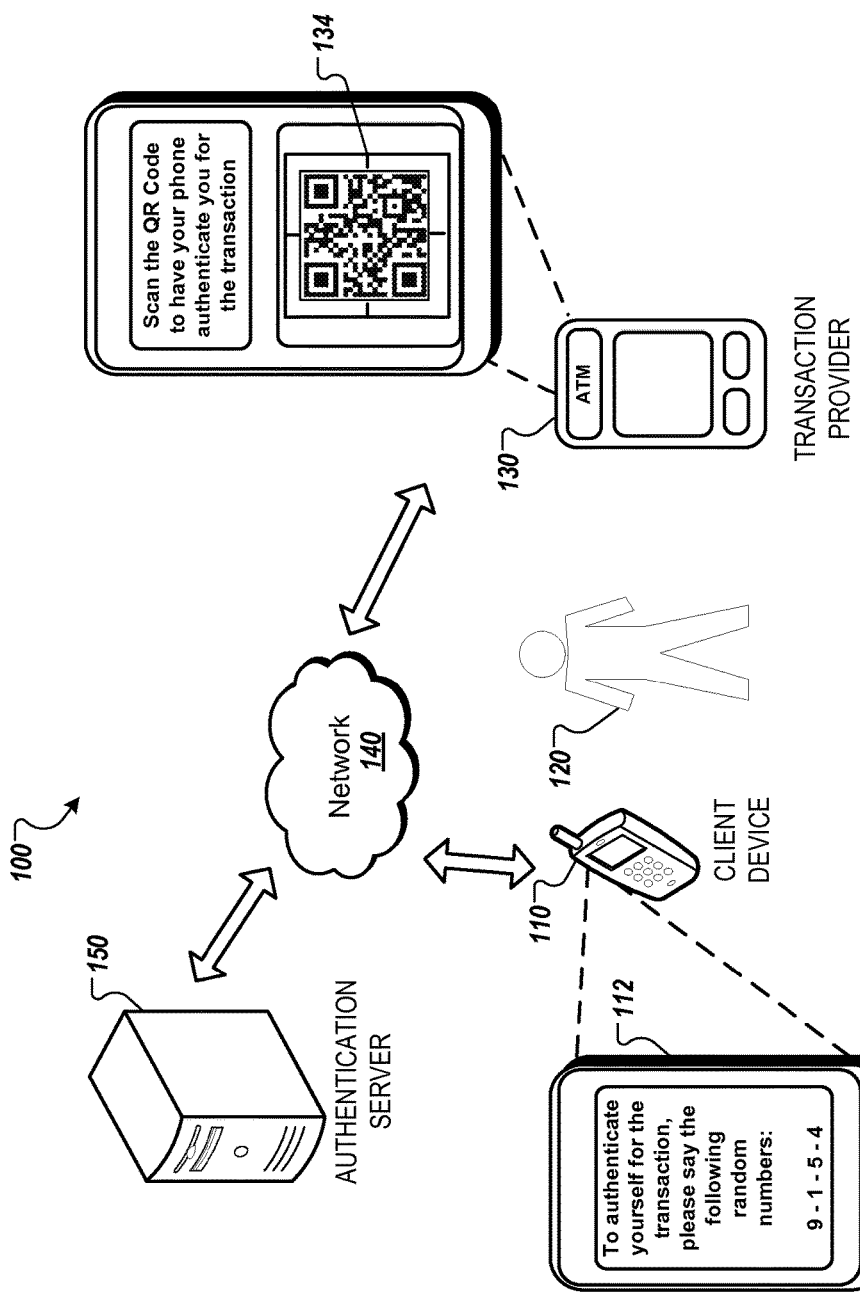
FIGS. 1A-B are illustrations of example systems for variable biometrics for multi-factor authentication.

In some instances, credentials for groups of users or for individuals may be generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from mobile credential management applications executing on client devices, e.g., a mobile phone.

However, it may be possible for unauthorized users to obtain access to credentials. For example, an individual's client device may be stolen. To prevent fraudulent use of a user's credentials from a client device, a system may determine if there is a risk that the individual using the client device is not the individual the credentials are for, e.g., a user, based on information from the client device. For example, the system may determine that there is a risk by determining that motion information from the client device is inconsistent with typical motion of the client device caused by the user. In another example, the system may determine that there is a risk by determining that the client device is being held more parallel to the ground than the user typically holds the client device when using the client device.

When the system determines that there is a risk that the individual using the client device is not the user, the system may not perform a transaction that relies on credentials for the user stored by the client device until the system biometrically authenticates the individual using the client device as the user. For example, even though the client device may store credentials that authorize a particular user to log into an account of the user, withdraw money from an automated teller machine (ATM), enter secured premises, or verify that the user is at a particular location at a particular time, if the system determines that there is a risk that the individual using the client device is not the user the credentials are for, the system may require that the individual using the client device to be biometrically authenticated as the user before performing the transaction.

The system may biometrically authenticate users by a voice sample, fingerprint, retina scan, and/or facial scan. For example, the client device may request that the user say something and capture what the user says using a microphone in the client device. In another example, the client device may request that the user place a finger on a fingerprint scanner of the client device. In yet another example, the client device may request that the user position a camera for scanning the user's retina and/or face. The system may then authenticate the user's identity by comparing the biometric information received by the client device with biometric information that was previously associated with the user.

The system may also vary the type of biometric information used to authenticate the user. The system may use more secure but less convenient forms of biometric authentication as the risk that the individual using the client device is not the user increases. For example, for low risk, the system may only use voice recognition, for medium risk, the system may use finger print scanning, for high risk, the system may use facial scanning, and for very high risk, the system may use a combination of voice recognition, finger print scanning, and facial scanning.

In some instances, the system may also vary the type of biometric information used to authenticate the user based on the environment of the client device. For example, if the current environment of the client device is noisy, the system may use finger print scanning instead of voice recognition.

FIG. 1A is an illustration of an example system for variable biometrics for multi-factor authentication. As an overview, an authentication server 150 may authenticate a user 120 using varying types of biometrics by communicating via a network 140 with a transaction provider 130 that requests confirmation that a transaction associated with the user 120 may be performed and a client device 110 that obtains biometric information regarding the individual that is using the client device 110 and provides the biometric information to the authentication server 150.

The transaction provider 130 may be one or more computing devices that may perform transactions. Transactions may include financial transactions, such as withdrawing money from a user's bank account, and also non-financial transactions, such as verifying that the user 120 is at a certain place at a certain time. The transaction provider 130 may perform a transaction in response to a request from the user. For example, the user 120 may request that the transaction provider 130 display a current bank balance for the user 120 or request that the transaction provider 130 verify that the user 120 is at home when the user 120 is supposed to be home.

Before the transaction provider 130 completes the transaction associated with the user 120, the transaction provider 130 may request confirmation that the transaction associated with the user 120 may be performed. For example, before displaying the current bank balance for "JOHN DOE" in response to a request from the user 120, the transaction provider 130 may request confirmation that the individual requesting the transaction is in fact "JOHN DOE."

The transaction provider 130 may request confirmation that the transaction associated with the user 120 may be performed by providing an indication of the transaction to the client device 110. The indication of the transaction may include information that identifies the user 120, the particular transaction, and the transaction provider 130. For example, for a particular transaction for the user "JOHN DOE," a transaction provider that is identified as "PROVIDER #BANK_OF_USERS" may generate a unique identifier for the transaction, e.g., "TRANSACTION #168451." The transaction provider may then provide an indication of the transaction request that includes "JOHN DOE," identifying that transaction is associated with the user "JOHN DOE," "PROVIDER #BANK_OF_USERS," identifying that the transaction provider 130 requesting the authentication is the transaction provider 130 identified as "PROVIDER #BANK_OF_USERS," and "TRANSACTION #168451," identifying that the transaction for confirmation is uniquely identified as "TRANSACTION #168451."

The transaction provider 130 may provide the indication of the transaction to the client device 110 in a variety of different forms. For example, the indication may be provided by an alphanumeric code, a sound signal (e.g., an audible sound signal or an ultrasonic sound signal), an optical machine-readable representation 134 (e.g., a barcode or a quick response (QR) code), a parametrically-generated graphical representation, an animated graphic representation, and/or a phrase, among others.

As referred to herein, an alphanumeric code may be a sequence of numbers and/or letters (e.g., 4 to 24 characters) that is associated with a transaction. In some instances, a given alphanumeric representation will only be valid for a certain time period. The transaction provider 130 may associate an alphanumeric code with the user 120, the transaction, and the transaction provider 130, and display the alphanumeric code on a display of the transaction provider 130, e.g., a screen of the ATM. The user 120 may then read the alphanumeric code and input the code into the client device 110, e.g., pressing keys on the client device 110 that correspond to the code.

As referred to herein, an optical machine-readable representation 134 may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing the transaction and any other suitable data. As an example, the transaction provider 130 may generate a QR code identifying the user 120, the transaction, and the transaction provider 130.

The transaction provider 130 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques —QR Code 2005 bar code symbology specification.

The transaction provider 130 may display the optical machine-readable representation 134 on a display of the transaction provider 130, e.g., a screen of the ATM. The user 120 may then use the client device 110 to scan at least the portion of the display of the transaction provider 130 that shows the representation 134.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The sound signal may encode data associated with the user 120, the transaction, and the transaction provider 130. The transaction provider 130 may use any suitable technique for encoding the sound signal. For example, the client device may call a function or library routine that encodes data into sound signals such as the Zoosh SDK by Naratte, Inc. The transaction provider 130 can then output the sound signal from a speaker coupled to the transaction provider 130 for reception by the client device 110.

In response to providing the indication of the transaction request to the client device 110, the transaction provider 130 may receive a confirmation that the transaction may be performed. The confirmation that the transaction may be performed may be a confirmation of the identity of the user 120 from the authentication server 150. For example, in response to providing an indication of a transaction associated with a user "JOHN DOE," identifying the provider "PROVIDER #BANK_OF_USERS," and identifying the transaction "TRANSACTION #168451," the transaction provider 130 may receive a confirmation from the authentication server 150 that the identity of the individual currently using the client device 110 that received the transaction identified as "TRANSACTION #168451" is biometrically confirmed as the user "JOHN DOE."

In response to receiving a confirmation the transaction may be performed, the transaction provider 130 may complete the transaction. For example, in response to receiving a confirmation from the authentication server 150 that the individual using the client device 110 is biometrically authenticated as "JOHN DOE," the transaction provider 130 may display the bank balance for "JOHN DOE."

The client device 110 may be a computing device that obtains biometric input from the user 120. For example, the client device 110 may be a mobile phone that includes (i) a microphone that can capture speech from the user 120, (ii) a camera that can capture an image of the user's face or iris, and/or (iii) a fingerprint scanner that can generate a representation of a user's fingerprint. The client device 110 may also include other sensors that capture information regarding the client device 110 or the user 120. For example, the client device 110 may include one or more motion sensors that may capture orientation, acceleration, and/or velocity information of the client device 110 and one or more GPS sensors that may capture a position, e.g., latitude, longitude, and elevation, of the client device 110.

The client device 110 may receive an indication of the transaction from the transaction provider 130. For example, as described above, the client device 110 may receive the indication of the transaction from the transaction provider 130 in the form of an alphanumeric code, a sound signal, an optical machine-readable representation, a parametrically-generated graphical representation, an animated graphic representation, and/or a phrase, among others.

Based on the indication of the transaction, the client device 110 may provide a transaction request to the authentication server 150. The client device 110 may provide to the authentication server 150 at least a portion of the information indicating the transaction that the client device 110 receives from the transaction provider 130. For example, in response to receiving an indication of a transaction associated with a user "JOHN DOE," identifying the provider "PROVIDER #BANK_OF_USERS," and identifying the transaction "TRANSACTION #168451," the client device 110 may provide a transaction request to the authentication server 150 that also identifies the user "JOHN DOE," identifies the provider "PROVIDER #BANK_OF_USERS," and identifies the transaction "TRANSACTION #168451."

The transaction request that the client device 110 provides to the authentication server 150 may also include risk profile information. Risk profile information may describe the client device 110 or the individual using the client device 110. For example, the risk profile information may indicate orientation and motion of the client device 110 during the past minute as the client device 110 moved while the individual was walking. In a different example, the risk profile information may indicate the orientation and motion of the client device 110 as an optical machine-readable representation was scanned. In another example, the risk profile information may indicate how each character of an alphanumeric code was input into the client device 110. In yet another example, the risk profile information may indicate the orientation, height, and length of time that the user 120 held the client device 110 to capture a sound signal.

The risk profile information may additionally or alternatively include information regarding the transaction. For example, the risk profile information may indicate the current time, the current date, the current location of the client device 110, a type of transaction, and an amount for the transaction.

The client device 110 may also provide credentials of the user 120 that are stored on the client device 110 to the authentication server 150. For example, in response to receiving an indication of a transaction request identifying the user "JOHN DOE," identifying the provider "PROVIDER #BANK_OF_USERS," and identifying the transaction "TRANSACTION #168451, the client device 110 may identify a credential stored on the client device 110 that indicates that "JOHN DOE" is authorized to perform transactions with the provider "PROVIDER #BANK_OF_USERS," and the client device 110 may transmit the identified credential to the authentication server 150.

In response to providing the transaction request to the authentication server 150, the client device 110 may receive a request from the authentication server 150 for biometric input from the user 120. The request for biometric input may specify one or more particular types of biometric information for the client device 110 to obtain from the individual using the client device 110. For example, the client device 110 may receive a request for vocal, fingerprint, facial, and/or iris biometric authentication.

In more detailed examples, the client device 110 may receive a request from the authentication server 150 where the request indicates that the client device 110 should prompt the individual using the client device 110 to say a predetermined number of random digits, e.g., the numbers "9-1-5-4," for the authentication server 150 to verify that the voice matches a pre-stored representation of the user's voice stored by the authentication server 150. In response, the client device 110 may display a prompt, "To authenticate yourself for the transaction, please say the following random numbers: 9-1-5-4."

In another example, the request may indicate that the client device 110 should prompt the individual using the client device 110 to take a photo of their face for the authentication server 150 to verify that the face matches a representation of the user's face stored by the authentication server 150. For example, the client device 110 may display a prompt, "To authenticate yourself for the transaction, please adjust the image so that your face appears in the box," and then store an image of the individual using the client device 110 once the individual's face appears in the box.

In yet another example, the request may indicate that the client device 110 should prompt the individual using the client device 110 to scan a fingerprint for the authentication server 150 to verify that the fingerprint matches a representation of a user's fingerprint stored by the authentication server 150. For example, the client device 110 may display a prompt "To authenticate yourself for the transaction, please place your finger on the fingerprint scanner" and then scan the individual's finger.

The client device 110 may prompt the individual using the client device 110 for the biometric input and then provide the obtained biometric information to the authentication server 150. For example, the client device 110 may generate a voice sample based on capturing the sounds made by the individual saying "9-1-5-4" and provide the voice sample to the authentication server 150.

The client device 110 may also receive a request from the authentication server 150 for non-biometric input from the user 120. For example, the client device 110 may receive a request from the authentication server 150 where the request indicates that the client device 110 should prompt the user 120 to enter a password, a pin number, or a signature, etc. The client device 110 may then receive the non-biometric input from the user 120 and provide the non-biometric information based on the non-biometric input to the authentication server 150.

The authentication server 150 may be one or more computing devices that authenticate the user 120 using variable biometrics. The authentication server 150 may store biometric information regarding the user 120. For example, the authentication server 150 may store a representation of a voice of the user 120, an image of the user's face, a scan of a user's fingerprint, or a scan of a user's iris. The authentication server 150 may also store non-biometric information for identifying the user 120. For example, the authentication server 150 may store a password, a pin number, or a signature for the user 120. The authentication server 150 may receive and store the biometric and non-biometric information for the user 120 when the user 120 initially registers to use the system 100 or during an update of the stored information.

The authentication server 150 may additionally or alternatively store information regarding a risk profile for the user 120. For example, the authentication server 150 may store information that indicates historical orientation and motion of the client device 110 as the individual moved the client device 110 to scan optical machine-readable representations. In another example, the authentication server 150 may store information that indicates timings between and for each input of alphanumeric codes. In yet another example, the authentication server 150 may store information that indicates the orientation, height, and length of time that the user 120 held the client device 110 to capture sound signals.

In an additional example, the authentication server 150 may store information that indicates the historical times, dates, locations, transaction provider, and types of transaction for previous transactions.

The authentication server 150 may receive a transaction request from the client device 110. For example, the authentication server 150 may receive a transaction request identifying the user "JOHN DOE," identifying the provider "PROVIDER #BANK_OF_USERS," identifying the transaction "TRANSACTION #168451. The transaction request may also include a credential stored on the client device 110 that indicates that "JOHN DOE" is authorized to perform transactions with the provider "PROVIDER #BANK_OF_USERS," and include risk profile information.

The authentication server 150 may determine a risk level for the transaction request based on the risk profile information. For example, the authentication server 150 may determine that the risk profile information for the transaction is not consistent with stored risk profile information regarding the user 120. In some particular examples, the authentication server 150 may determine from the risk profile information that the client device 110 is being held more parallel to the ground than the user 120 typically holds the client device 110 when using the client device 110. Accordingly, the authentication server 150 may determine that there is a low risk level that the client device is being used by someone other than the user 120.

In another example, the authentication server 150 may determine that the client device 110 is being held more parallel to the ground than the user 120 typically holds the client device 110 when using the client device 110, that the request is being made at a location in which the user 120 has never requested the transaction before, that the request is being made at a time at which the user 120 has never requested the transaction before, and that the transaction is to withdraw a larger amount of money than the user 120 typically withdraws. Accordingly, the authentication server 150 may determine that there is a high level risk that the individual using the client device 110 is not the user 120 associated with the transaction.

In yet another example, the authentication server 150 may determine that the client device 110 is requesting the transaction within two miles of a location in which the user 120 has requested the transaction before, is requesting the transaction at a time at which the user 120 has never requested the transaction before, and the transaction is to withdraw a large amount of money. Accordingly, the authentication server 150 may determine that there is a medium level risk that the individual using the client device 110 is not the user 120 associated with the transaction.

In some implementations, the authentication server 150 may additionally or alternatively determine a risk level for the transaction request based on the risk profile information that is not related to similarity between risk profile information received and risk profile information stored. For example, the authentication server 150 may determine a risk level for a transaction based on determining that a transaction request from the client device 110 indicates that the client device 110 scanned a QR code but motion data from the client device 110 indicates that the client device 110 was not moved. Accordingly, the authentication server 150 may determine that the request may be being spoofed and determine a high risk level for the transaction request. In another example, the authentication server 150 may determine a risk level for a transaction based on determining that a client device 110 has transmitted six transaction requests to open a secured door in the past minute but there is no reason for a user to request to open a secured door six times in a minute. Accordingly, the authentication server 150 may determine that the request may be being spoofed and determine a high risk level for the transaction request.

The authentication server 150 may determine that the individual using the client device 110 should be biometrically authenticated as the user 120 based on the risk level. The authentication server 150 may provide requests for varying biometric information based on the determined risk level. The type and amount of biometric authentication requested by the authentication server 150 for the different risk levels may balance convenience with security. For example, lower risk levels may be associated with authentication that is more convenient but less secure, and higher risk levels may be associated with authentication that is less convenient but more secure. In a particular example, in response to determining a low risk level, the authentication server 150 may provide the client device 110 a request for voice authentication by having the individual currently using the client device 110 speak some randomly generated numbers. In response to a high risk level, the authentication server 150 may provide the client device 110 a request for voice, fingerprint, and facial authentication.

In some implementations, the risk levels may also be associated with non-biometric authentication. For example, at higher risk levels, the authentication server 150 may provide the client device 110 a request for non-biometric information, e.g., a password, a pin, or signature from the individual using the client device 110.

In response to the request for biometric information, the authentication server 150 may receive biometric information from the client device 110. For example, the authentication server 150 may receive a voice sample of the individual using the client device 110. The authentication server 150 may determine that the received biometric information matches biometric information stored for the user 120. For example, the authentication server 150 may determine that the voice sample matches a pre-stored representation of the user's voice stored by the authentication server 150. Alternatively or additionally, the authentication server 150 may determine that a fingerprint from the client device 110 matches a representative fingerprint associated with the user 120, that an iris scan from the client device 110 matches a representative iris image associated with the user 120, and/or that a facial scan from the client device 110 matches a representation of the user's face.

Similarly, in response to the request for non-biometric information, the authentication server 150 may receive non-biometric information. For example, the authentication server 150 may receive a password, a pin, or a signature from the client device 110. The authentication server 150 may determine if the received non-biometric information matches non-biometric information stored for the user 120. For example, the authentication server 150 may determine if a received password matches a stored password for the user 120, determine if a received pin matches a stored pin for the user 120, and/or determine if a received signature matches a stored signature for the user 120.

In response to determining that the biometric information and/or the non-biometric information matches biometric information and/or non-biometric information stored for the user 120 and receiving a suitable credential for the transaction, the authentication server 150 may provide a confirmation that the transaction may be performed. The confirmation may be that the individual using the client device 110 has been authenticated as the user 120. For example, the authentication server 150 may provide a confirmation to the provider "PROVIDER #BANK_OF_USERS" that for the transaction identified as "TRANSACTION #168451" for the user "JOHN DOE," the individual using the client device 110 has been authenticated as "JOHN DOE." In another example, the confirmation may simply be an indication that a particular transaction may be completed. For example, the authentication server 150 may provide the transaction provider 130 an indication that the transaction identified as "TRANSACTION #168451" may be completed To provide the confirmation, the authentication server 150 may determine the transaction provider to receive the confirmation based on the transaction provider identified in the transaction request. For example, the authentication server 150 may determine based on the identification of the provider "PROVIDER #BANK_OF_USERS" that the provider "PROVIDER #BANK_OF_USERS" is to receive the confirmation.

In some implementations, the system 100 may also vary the biometric information used to authenticate the user 120 based on the environment of the client device 110. For example, if the current environment of the client device 110 is noisy, the authentication server 150 may authenticate the user 120 using a fingerprint scan instead of voice input. In another example, if the current environment of the client device 110 is dark, the authentication server 150 may authenticate the user 120 using a password and a fingerprint scan instead of using facial recognition. In yet another example, if the current environment of the client device 110 is cold, the authentication server 150 may authenticate the user 120 using facial recognition instead of a fingerprint scan.

The authentication server 150 may vary the biometric information used to authenticate the user 120 based on environmental information received from the client device 110. Environmental information may include noise, temperature, brightness, etc. For example, the authentication server 150 may receive audio input from the client device 110 and determine that the audio input has background noise that is above a predetermined maximum threshold of noise. In another example, instead of receiving audio input from the client device 110, the authentication server 150 may receive an indication from the client device 110 that the client device 110 has determined that the background noise is above the predetermined maximum threshold of noise.

The authentication server 150 may receive the environmental information before providing the request for biometric information to the client device 110. For example, the client device 110 may initially provide environmental information to the authentication server 150 along with the transaction request. The authentication server 150 may then determine the initial request for biometric information based on the environmental information. Additionally or alternatively, the authentication server 150 may receive the environmental information after providing the request for biometric information to the client device 110. For example, the client device 110 may provide a voice input after the authentication server 150 provides a request for voice input to the client device 110 and the authentication server 150 may determine background noise in the voice input.

The authentication server 150 may determine the biometric information to request based on the received environmental information. For example, based on determining that the background noise is above a predetermined maximum threshold and that the brightness is above a predetermined minimum threshold from the environmental information, the authentication server 150 may determine to request a facial scan instead of a voice input.

In some implementations, the system 100 may also enable the user 120 to select which type of biometric authentication to use. For example, if the client device 110 receives a request for voice input from the authentication server 150, the client device 110 may display a prompt for voice input and also display an option for the user 120 to provide biometric information that may be considered more secure, e.g., providing fingerprint scan, a facial scan, or an iris scan. In some implementations, the client device 110 may receive an indication of which types of biometric authentication that the authentication server 150 will accept based on the risk level and may allow the user 120 to select from the types of biometric authentication.

In some implementations, the transaction provider 130 may request additional biometric authentication from the user. For example, after the transaction provider 130 receives an initial confirmation of the user's identity from the authentication server 150, the transaction provider 130 may receive a transaction request of withdrawing $5,000 from the user's bank account and determine that based on the amount and type of the transaction, that the transaction provider 130 also wants confirmation of authentication by facial recognition.

The transaction provider 130 may determine when to request additional biometric authentication from the user based on one or more rules customized by the transaction provider 130. For example, the transaction provider 130 may customize a rule that states that if a user wishes to withdraw more than $50 from the user's bank account, the user's identity needs to be authenticated by facial recognition. The customized rules may be based on a type of the transaction where different types of transaction may be associated with different biometric authentication. For example, types of transactions may include withdrawing less than a threshold amount of money, withdrawing more than a threshold amount of money, displaying a bank balance, verifying presence at a location, or gaining access to secured premises.

When requesting additional biometric authentication based on the type of transaction, the transaction provider 130 may identify the type of biometric authentication that the transaction provider 130 wants used. For example, the transaction request may identify that the transaction provider 130 wants the authentication server 150 to authenticate the user by facial recognition.

In some implementations, the authentication server 150 may permit the client device 110 to avoid obtaining biometric information from the individual using the client device 110 if the authentication server 150 has already biometrically authenticated the user 120 within a predetermined amount of time. For example, if the client device 110 receives a request for voice input from the individual using the client device 110 but has already provided voice input for the individual in the past thirty minutes, the client device 110 may provide the authentication server 150 the previously obtained voice input or an indication that the individual has already been authenticated by voice input.

In some implementations, the authentication server 150 may store information regarding previous authentications of the user 120 and may determine not to even provide a request for biometric information to the client device 110 based on stored information regarding previous authentications. For example, the authentication server 150 may store information indicating that the individual using the client device 110 was voice authenticated as the user 120 thirty minutes beforehand and so may provide the confirmation of authentication to the transaction provider 130 without requesting the client device 110 for voice input.

In some implementations, the authentication server 150 may permit the client device 110 to avoid obtaining biometric information based on predetermined periods of time that are specific for types of biometric authentication, types of risk levels, and/or types of transactions. For example, voice input may be valid for thirty minutes, fingerprint scans may be valid for twenty minutes, and facial scans may be valid for ten minutes. In another example, a biometric authentication for a low risk level may be valid for one hour, a biometric authentication for a medium risk level may be valid for fifteen minutes, and a biometric authentication for a high risk level may be valid for five minutes.

Figure 1B:
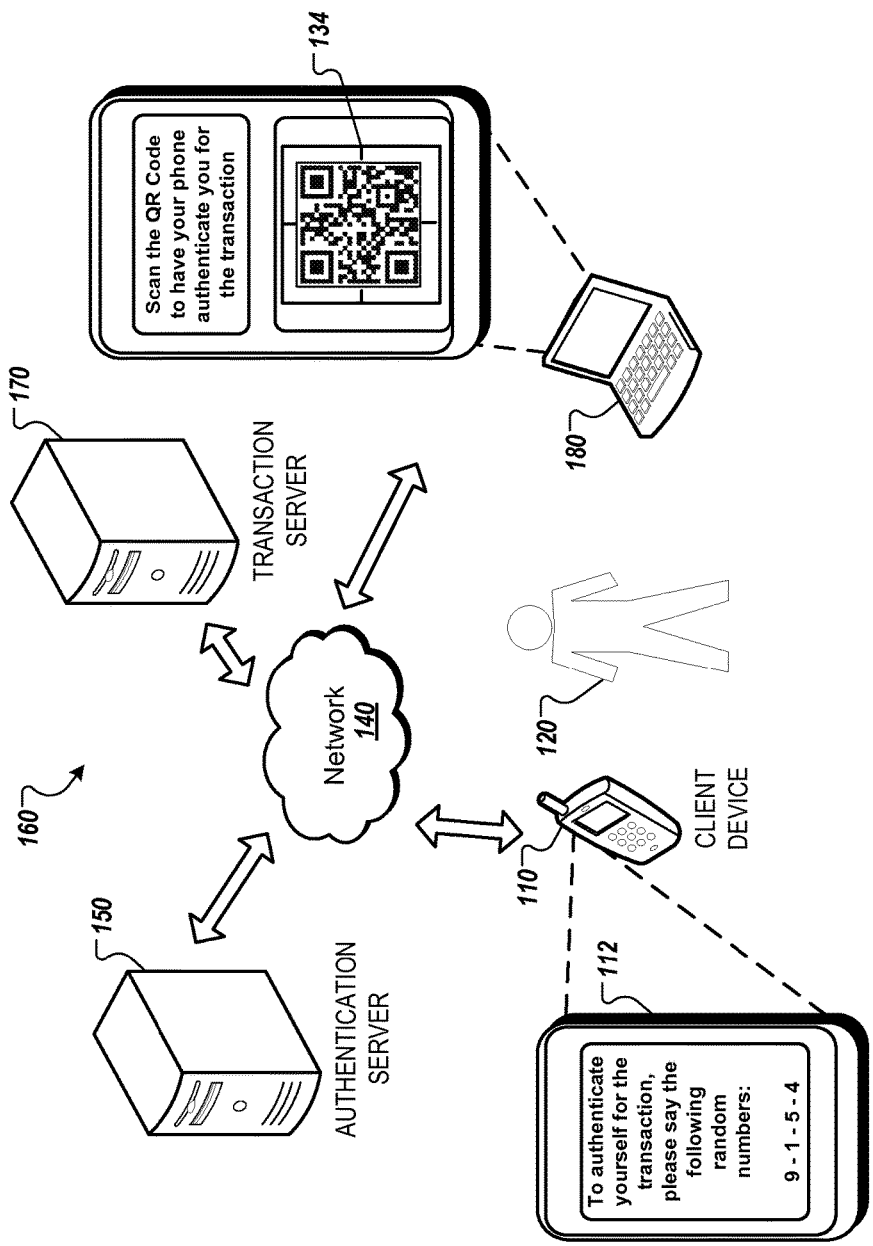

FIG. 1B is an illustration of another example system 160 for variable biometrics for multi-factor authentication. As an overview, the system 160 may be similar to the system 100, but in the system 160 the transaction provider 130 may be replaced with a transaction server 170 that interacts with a computing device 180 that is used by the user 120. For example, the transaction server 170 may be a server for a bank and the computing device 180 may be a computer with a web browser that the user 120 may use to access the user's account via a website hosted by the bank's server. The functionality of the transaction server 170 and the computing device 180 may be similar to the functionality of the transaction provider 130. For example, the transaction server 170 may generate the indication of the transaction and provide the indication to the computing device 180 for the computing device 180 to provide the client device 110. In the example, the transaction server 170 may generate a QR code and transmit the QR code to the computing device 180. The computing device 180 may then display the QR code and the user 120 may then scan the QR code using the client device 110.

Figure 2:
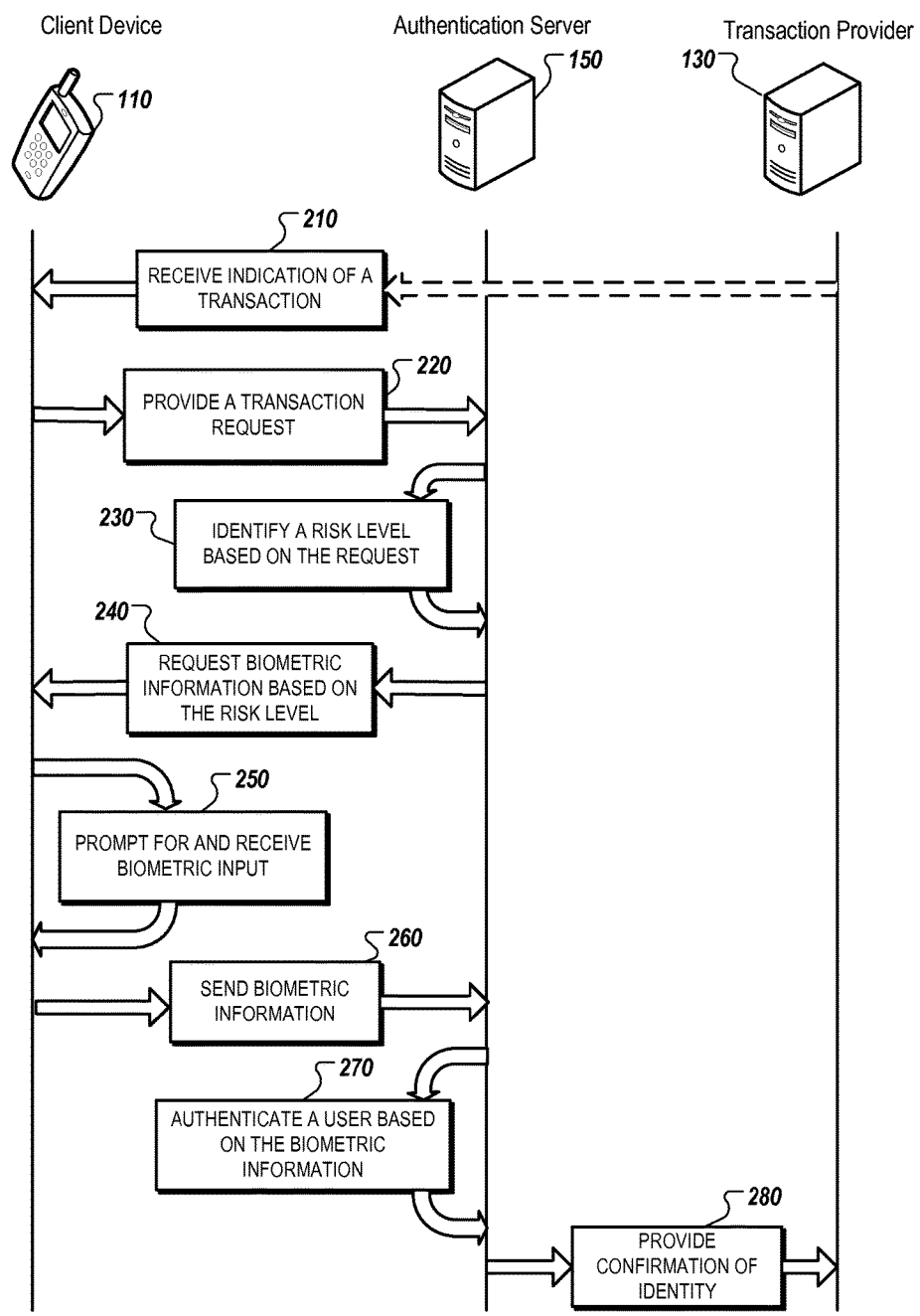
FIG. 2 is a messaging diagram that illustrates examples of messages between a client device, an authentication server, and a transaction provider.

FIG. 2 is a messaging diagram 200 that illustrates examples of messages between a client device, an authentication server, and a transaction provider. The following describes the messages between components of the system 100 that are described with reference to FIG. 1. However, the messaging may be performed by other systems or system configurations. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, the user 120 may request that the transaction provider 130 perform a transaction. For example, the user 120 may request that a security system unlock a secured door. The transaction provider 130 may then generate an indication of the transaction. For example, the security system may generate a QR code representing the request to unlock the secured door and display the QR code on a display of the security system.

The client device 110 may receive the indication of the transaction (210). For example, the user 120 may scan the QR code on the display of the security system by moving the client device 110 so that a camera of the client device 110 can capture an image including the QR code displayed on the display of the security system.

The client device 110 may then provide the transaction request to the authentication server 150 (220). For example, the client device 110 may determine that the user "JANE DOE" is currently logged in on the client device 110 and has credentials to open the secured door, and may then provide a transaction request to the authentication server 150 that the user "JANE DOE" wishes to unlock the secured door. The transaction request may include risk profile information that describes the motion of the client device 110 during the past minute, which includes motion while scanning the QR code.

The authentication server 150 may identify a risk level for the transaction based on the transaction request (230). For example, the authentication server 150 may determine that the motion of the client device 110 as the QR code was scanned and prior motion of the client device 110, e.g., which may indicate a speed and gait of the user's walk or a path the user takes, is very different from the typical motion of the client device 110 associated by the user 120, and determine that there is a high risk level that the individual using the client device 110 is not the user 120.

The authentication server 150 may provide a request for biometric information based on the risk level (240). For example, based on determining that there is a high risk level that the individual using the client device 110 is not the user 120, the authentication server 150 may provide a request to the client device 110 for fingerprint authentication and a pin code.

The client device 110 may prompt the user for the requested biometric information (250). For example, the client device 110 may display a prompt "Please scan your finger" followed by the prompt "please enter your pin code." The client device 110 may then receive the biometric input in response to the prompt. For example, the client device 110 may receive a fingerprint scan along with an entered pin code.

The client device 110 may then send the biometric input to the authentication server 150 (260). For example, the client device 110 may send the fingerprint scan and the entered pin code to the authentication server 150.

The authentication server 150 may authenticate the user 120 based on the biometric input (270). For example, the authentication server 150 may determine that the fingerprint scan and the entered pin code match a representation of a fingerprint and a stored pin for the user 120.

The authentication server 150 may then provide confirmation of the user's identity to the transaction provider 130 (280). For example, the authentication server 150 may provide a confirmation to the security system that the user is authenticated as "JANE DOE."

In some implementations, the authentication server 150 may provide a confirmation of identity to the client device 110 for the client device 110 to provide to the transaction provider 130. For example, the authentication server 150 may provide a confirmation to the client device 110 and based on the confirmation, the client device 110 may then generate an alphanumeric code, a sound signal, or an optical machine-readable representation that is received by the transaction provider 130.

Figure 3:
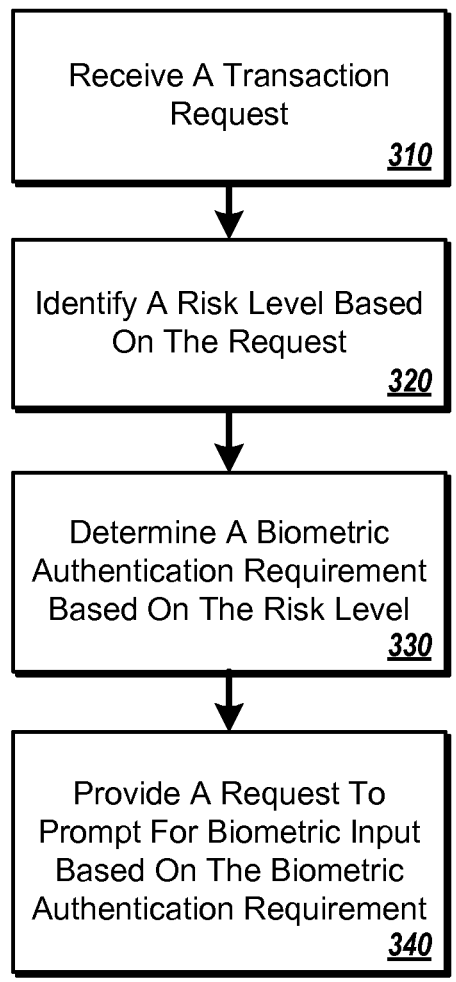
FIG. 3 is a flowchart of an example process for variable biometrics for multi-factor authentication.

FIG. 3 is a flowchart of an example process 300 for variable biometrics for multi-factor authentication. The following describes the processing 300 as being performed by components of the system 100 that are described with reference to FIG. 1. However, the process 300 may be performed by other systems or system configurations.

The authentication server 150 may receive a transaction request (310). The transaction request may be received from a client device 110 that scans a QR code generated by a transaction provider 130 that wishes to confirm that the user of the transaction provider 130 is authorized to complete a requested transaction. The transaction request may identify a user, a transaction provider, and a transaction, and may include risk profile information identifying motion and orientation of the client device 110.

The authentication server 150 may identify a risk level based on the request (320). The authentication server 150 determine a risk level based on determining how closely the risk profile information matches information stored regarding the user. The more different the risk profile information received from the client device 110 is from information stored regarding the user, the higher the determined risk level. For example, the authentication server 150 may determine the client device 110 received an indication of the transaction request by scanning a QR code, based on determining that the QR code was scanned, determine how client device 110 was moved to scan the QR code was slightly different than how the user typically scans a QR code, and based on determining that the client device 110 was moved to scan the QR code slightly differently, determine that the risk level is low.

The authentication server 150 may determine a biometric authentication requirement associated with the risk level (330). For example, the authentication server 150 may determine that a low risk level is associated with a biometric authentication requirement of voice authentication. The authentication server 150 may additionally or alternatively determine that the low risk level may also be satisfied by a facial scan, iris scan, or fingerprint scan.

The authentication server 150 may provide a request to prompt for biometric information based on the biometric authentication requirement (340). For example, the authentication server 150 may provide the client device 110 a request that the client device 110 prompt the individual using the client device 110 for voice input.

Figure 4:
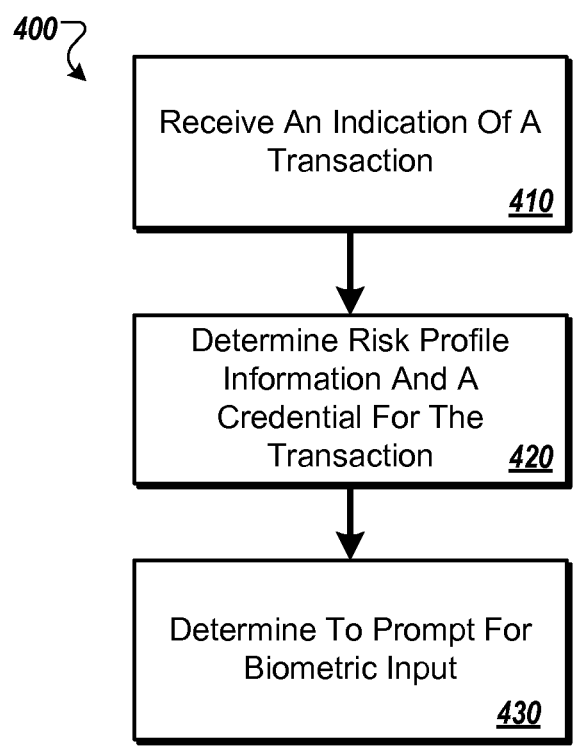
FIG. 4 is a flowchart of an example process for variable biometrics for multi-factor authentication.

FIG. 4 is a flowchart of an example process 400 for variable biometrics for multi-factor authentication. The following describes the processing 400 as being performed by components of the system 100 that are described with reference to FIG. 1. However, the process 400 may be performed by other systems or system configurations.

The client device 110 may receive an indication of a transaction (410). For example, the client device 110 may receive an alphanumeric code, a sound signal, or an optical machine-readable representation that indicates a transaction that a user is requested to be performed.

In response to receiving the indication of a transaction, the client device 110 may determine risk profile information and a credential for the transaction (420). For example, the client device 110 may determine motion and location information for the past minute that are measured by sensors in the client device 110 and a credential stored on the client device 110 that matches a credential necessary to perform the transaction.

In response to determining risk profile information and a credential for the transaction, the client device 110 may determine to prompt for biometric input (430). For example, the client device 110 may generate a transaction request representing the transaction and the risk profile information, and transmit the transaction request to an authentication server 150. The client device 110 may then receive a request to prompt for fingerprint scanning input based on the server determining that there is a medium risk level based on the risk profile information, and based on receiving the request, the client device 110 may determine to prompt for biometric input. In another example, the client device 110 may determine to prompt for voice input based on determining a biometric authentication requirement of voice input based on determining a low risk level based on determining low dissimilarity of the risk profile information for the transaction to risk profile information that is already stored for a user.

In some implementations, credentials of a user that are stored on a client device 110 may be revoked. The authentication server 150 may revoke credentials based on a risk level of a transaction and a failure of the individual to provide biometric input that satisfies biometric authentication for the risk level. For example, the authentication server 150 may determine that there is a high risk level and that the authentication server 150 does not receive biometric information from the client device 110 that matches biometric information the authentication server 150 has stored for the user. Based on the determination, the authentication server 150 may then revoke or suspend the user's credential. The user's credential may be unsuspended or unrevoked if the user 120 later verifies the user's identity. For example, the user 120 may need to take the client device 110 to a location that provides proctored authentication to undergo proctored authentication to unsuspend or unrevoke the user's credentials.

While described as being performed at the authentication server 150, the authentication of the biometric information may be performed partially or completely at the client device 110. For example, the client device 110 may access stored biometric identification of the user and compare it with biometric input of an individual for a transaction. The client device 110 may additionally or alternatively determine a risk level, determine a biometric authentication requirement based on a determined risk level, and determine to provide a prompt for biometric input based on a determined biometric authentication requirement.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A computer-implemented method comprising:
    generating, by a client device, motion data based on sensor readings from one or more sensors of the client device, the motion data indicating motion of the client device for at least a period of time before or during a first transaction;
    scanning, by the client device, an optical code, wherein the motion data indicates the motion of the client device to reach a position where the client device scanned the optical code;
    receiving, by the client device, an indication of a transaction, wherein the client device is configured to selectively prompt a user for biometric input of a type that is dynamically selected from among multiple different types of biometric input based at least on an analysis of the motion data;
    determining, by the client device, risk profile information and a credential for the first transaction, the risk profile information describing a location of the client device, a time associated with the first transaction, and a transaction provider to complete the first transaction, and the risk profile information is based on a comparison of (i) the data indicating the motion of the client device to reach the position where the client device scanned the optical code with (ii) data that describes motion of the client device to reach one or more positions where the client device scanned an optical code for one or more prior transactions; and
    providing, by the client device, a prompt for biometric input that requests input of a particular type of biometric input that is dynamically selected from among the multiple different types of biometric input, wherein the particular type of biometric input is selected according to an authentication requirement based on the motion data, the location of the client device, the time associated with the transaction, the transaction provider to complete the transaction, and the credential.

2. The method of claim 1, wherein receiving an indication of a transaction comprises:
    receiving the indication of the transaction by obtaining an optical machine-readable representation for the transaction.

3. The method of claim 1, wherein receiving, by the client device, an indication of a transaction comprises:
    obtaining an acoustic representation for the transaction.

4. The method of claim 1, wherein determining risk profile information and a credential for the transaction comprises:
    identifying a credential stored on the client device that corresponds with the transaction.

5. The method of claim 1, comprising:
    providing the risk profile information and the credential to a server;
    receiving, from the server, a request for the biometric input; and
    determining to prompt for the biometric input based on receiving the request for the biometric input.

6. The method of claim 1, comprising:
    obtaining a risk level for the transaction based on the risk profile information and the credential;
    determining a biometric authentication requirement based on the risk level; and
    determining to prompt for the biometric input based on the biometric authentication requirement.

7. The method of claim 6, wherein obtaining a risk level for the transaction based on the risk profile information and the credential comprises:
    determining a level of similarity between the risk profile information and historical information describing motion of the client device for previous transactions; and
    determining the risk level for the transaction based on the determined level of similarity.

8. The method of claim 6, wherein obtaining a risk level for the transaction based on the risk profile information and the credential comprises:
    providing the risk profile information and the credential to a server; and
    receiving the risk level for the transaction from the server.

9. The method of claim 1, comprising:
    determining an environmental condition that potentially interferes with biometric authentication using a biometric input; and
    in response to determining the environmental condition that potentially interferes with the biometric authentication using the biometric input, determining, by the client device, to prompt for another type of biometric input.

10. The method of claim 9, wherein determining an environmental condition that potentially interferes with biometric authentication using a biometric input comprises:
    determining that the biometric input indicates the environmental condition that potentially interferes with the biometric authentication using the biometric input.

11. The method of claim 1, comprising:
receiving the biometric input from a user;
providing the received biometric input to a server;
in response to providing the received biometric input to the server, receiving a confirmation of an identity of the user; and
in response to receiving a confirmation of an identity of the user, providing a confirmation of the identity of the user to a transaction provider to complete the transaction.

12. The method of claim 1, comprising selecting voice input from among the multiple different types of biometric input;
wherein providing the prompt for biometric input comprises providing a prompt for voice input.

13. The method of claim 1, comprising selecting fingerprint input from among the multiple different types of biometric input;
wherein providing the prompt for biometric input comprises providing a prompt for fingerprint input.

14. The method of claim 1, comprising selecting voice input and fingerprint input from among the multiple different types of biometric input;
wherein providing the prompt for biometric input comprises providing a prompt for voice input, fingerprint input, and a non-biometric authentication input.

15. The method of claim 1, wherein the motion data includes data that describes a path the client device travelled during the period of time before the transaction; and
wherein the risk profile information is based on a comparison of the data that describes the path with data that describes one or more paths that the client device travelled before one or more prior transactions of the user.

16. The method of claim 1, wherein the motion data includes data that describes an orientation of the client device during the transaction; and
wherein the risk profile information is based on a comparison of the data that describes the orientation with data that describes one or more orientations of the client device during one or more prior transactions of the user.

17. The method of claim 1, wherein the method comprises scanning, by the client device, an optical code; and
wherein the motion data includes data that describes motion of or an orientation of the client device during scanning of the optical code.

18. A system comprising:
one or more computers; and
one or more storage devices storing instructions that are operable, when executed by the one or more computers, to cause the one or more computers to perform operations comprising:
generating, by a client device, motion data based on sensor readings from one or more sensors of the client device, the motion data indicating motion of the client device for at least a period of time before or during a first transaction;
scanning, by the client device, an optical code, wherein the motion data indicates the motion of the client device to reach a position where the client device scanned the optical code;
receiving, by the client device, an indication of a transaction, wherein the client device is configured to selectively prompt a user for biometric input of a type that is dynamically selected from among multiple different types of biometric input based at least on an analysis of the motion data;
determining, by the client device, risk profile information and a credential for the first transaction, the risk profile information describing a location of the client device, a time associated with the first transaction, and a transaction provider to complete the first transaction, and the risk profile information is based on a comparison of (i) the data indicating the motion of the client device to reach the position where the client device scanned the optical code with (ii) data that describes motion of the client device to reach one or more positions where the client device scanned an optical code for one or more prior transactions; and
providing, by the client device, a prompt for biometric input that requests input of a particular type of biometric input that is dynamically selected from among the multiple different types of biometric input, wherein the particular type of biometric input is selected according to an authentication requirement based on the motion data, the location of the client device, the time associated with the transaction, the transaction provider to complete the transaction, and the credential.

19. A non-transitory computer-readable medium storing software comprising instructions executable by one or more computers which, upon such execution, cause the one or more computers to perform operations comprising:
generating, by a client device, motion data based on sensor readings from one or more sensors of the client device, the motion data indicating motion of the client device for at least a period of time before or during a first transaction;
scanning, by the client device, an optical code, wherein the motion data indicates the motion of the client device to reach a position where the client device scanned the optical code;
receiving, by the client device, an indication of a transaction, wherein the client device is configured to selectively prompt a user for biometric input of a type that is dynamically selected from among multiple different types of biometric input based at least on an analysis of the motion data;
determining, by the client device, risk profile information and a credential for the first transaction, the risk profile information describing a location of the client device, a time associated with the first transaction, and a transaction provider to complete the first transaction, and the risk profile information is based on a comparison of (i) the data indicating the motion of the client device to reach the position where the client device scanned the optical code with (ii) data that describes motion of the client device to reach one or more positions where the client device scanned an optical code for one or more prior transactions; and
providing, by the client device, a prompt for biometric input that requests input of a particular type of biometric input that is dynamically selected from among the multiple different types of biometric input, wherein the particular type of biometric input is selected according to an authentication requirement based on the motion data, the location of the client device, the time associated with the transaction, the transaction provider to complete the transaction, and the credential.

* * * * *

UNITED STATES PATENT AND TRADEMARK OFFICE
CERTIFICATE OF CORRECTION

PATENT NO. : 10,163,105 B1
APPLICATION NO. : 14/600274
DATED : December 25, 2018
INVENTOR(S) : Siamak Ziraknejad et al.

Page 1 of 1

It is certified that error appears in the above-identified patent and that said Letters Patent is hereby corrected as shown below:

On the Title Page

Item (57), Column 2 (ABSTRACT), Line 6, delete "transaction" and insert --transaction.--, therefor.

Signed and Sealed this
Fourteenth Day of May, 2019

Andrei Iancu
*Director of the United States Patent and Trademark Office*